United States Patent
Zander

(10) Patent No.: US 9,559,537 B2
(45) Date of Patent: Jan. 31, 2017

(54) GUIDANCE LIGHT FOR MOBILE DEVICE

(71) Applicant: Sony Corporation, Tokyo (JP)

(72) Inventor: Olof Zander, Södra Sandby (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/320,909

(22) Filed: Jul. 1, 2014

(65) Prior Publication Data

US 2016/0006281 A1 Jan. 7, 2016

(51) Int. Cl.

| H02J 7/00 | (2006.01) |
|---|---|
| H05B 37/02 | (2006.01) |
| H05B 33/08 | (2006.01) |
| G06F 1/16 | (2006.01) |
| H04M 1/725 | (2006.01) |
| H04M 1/02 | (2006.01) |
| H04B 13/00 | (2006.01) |

(52) U.S. Cl.
CPC ............... *H02J 7/0047* (2013.01); *G06F 1/16* (2013.01); *H04B 13/005* (2013.01); *H04M 1/72569* (2013.01); *H05B 33/0806* (2013.01); *H05B 37/0218* (2013.01); *H05B 37/0227* (2013.01); *H04M 1/022* (2013.01); *H04M 1/0274* (2013.01)

(58) Field of Classification Search
CPC .. H02J 7/0047; H04B 13/005; H05B 37/0218; H05B 37/0227
USPC .......................................................... 315/134
See application file for complete search history.

(56) References Cited

U.S. PATENT DOCUMENTS

| 6,755,549 B2* | 6/2004 | Rogers | H04M 1/22 362/109 |
|---|---|---|---|
| 8,740,640 B2* | 6/2014 | Hardy | H01R 13/7175 439/490 |
| 9,225,127 B2* | 12/2015 | Rose | H01R 13/6683 |
| 9,265,126 B2* | 2/2016 | Lee | H04M 1/22 |
| 2005/0225983 A1* | 10/2005 | Fornell | H04M 1/22 362/276 |
| 2006/0039136 A1* | 2/2006 | Probasco | H01R 13/652 362/157 |
| 2007/0270183 A1* | 11/2007 | Tredwell | H04M 1/22 455/556.1 |

(Continued)

FOREIGN PATENT DOCUMENTS

| KR | 20140044220 A * | 4/2014 | G06F 1/16 |
|---|---|---|---|
| SE | WO 2010097659 A1 * | 9/2010 | H02J 7/0042 |

OTHER PUBLICATIONS

International Search Report and Written Opinion; Mar. 13, 2015; issued in International Patent Application No. PCT/EP2014/079430.

*Primary Examiner* — Dylan White
(74) *Attorney, Agent, or Firm* — James C. Edwards; Moore & Van Allen PLLC

(57) ABSTRACT

The invention is directed to activating a guidance light for a mobile device. The guidance light is located proximate to connector, such that activation of the guidance light serves to help a user guide a charging wire into the connector, especially during less than ideal lighting conditions. Specific embodiments of the invention provide for determining, at the mobile occurrence of a trigger and, in response to determining the trigger event activating the guidance light.

7 Claims, 4 Drawing Sheets

(56) References Cited

U.S. PATENT DOCUMENTS

| | | | | |
|---|---|---|---|---|
| 2008/0054845 A1* | 3/2008 | Wang | ............... | H02J 7/0042 320/111 |
| 2008/0102689 A1* | 5/2008 | Dhir | ............... | H01R 13/7175 439/490 |
| 2008/0170403 A1* | 7/2008 | Gurevich | ............... | G06F 1/1626 362/319 |
| 2011/0050171 A1* | 3/2011 | Ron | ............... | H02J 7/0042 320/114 |
| 2013/0050233 A1* | 2/2013 | Hirsch | ............... | G06F 3/038 345/589 |
| 2013/0065444 A1* | 3/2013 | Bushnell | ............... | H01R 13/631 439/620.22 |
| 2013/0303263 A1* | 11/2013 | LeMay | ............... | G07F 17/3218 463/25 |
| 2014/0139486 A1* | 5/2014 | Mistry | ............... | G06F 3/0304 345/175 |
| 2014/0170903 A1* | 6/2014 | Tuchrelo | ............... | H01R 13/7175 439/620.21 |
| 2015/0070832 A1* | 3/2015 | Schneider | ............... | G06F 1/1632 361/679.41 |

* cited by examiner

GUIDANCE LIGHT FOR MOBILE DEVICE

BACKGROUND

A mobile device may be operated using a battery or other power source with a limited power capacity. The power source needs to be recharged on a periodic basis because the power source has limited power capacity. The power source may or may not be detached from the mobile device while recharging the power source. Usually, the power source is retained in the mobile device during the recharging process. In order to recharge the power source, a wire carrying a charging current from a charging power source ("charger") is connected to a connector (e.g., a micro Universal Serial Bus ("USB") connector) located on the surface of the mobile device. For example, the charger may be a micro-USB charger. The connector is a small cavity that may be difficult to find in low-light conditions (e.g., when the amount of available ambient light is less than a threshold light level). For example, the connector may be difficult to find in a dark room. Therefore, there is a need to enable a user of the mobile device to more easily find the connector in low-light conditions.

BRIEF SUMMARY

Embodiments of the invention are directed to a system, method, and computer program product for activating a guidance light. An exemplary method comprises: determining, by the mobile device, occurrence of a trigger event for the guidance light; in response to determining occurrence of the trigger event, activating the guidance light, the guidance light being associated with a connector located in the mobile device, the connector for receiving a charger, the charger for charging a power source in the mobile device.

In some embodiments, determining occurrence of the trigger event comprises determining whether a charger is detected by the mobile device.

In some embodiments, the charger is detected using a body area network (BAN) technique.

In some embodiments, determining occurrence of the trigger event comprises determining whether a charger is located at a distance less than a threshold distance from the mobile device.

In some embodiments, determining occurrence of the trigger event comprises determining whether an ambient light level is less than a threshold light level.

In some embodiments, determining occurrence of the trigger event comprises determining whether a power level of the power source is less than a threshold power level.

In some embodiments, the method further comprises indicating, using the guidance light, a status of charging the power source.

In some embodiments, the guidance light changes color, intensity, or brightness when a power level of the power source is equal to or greater than a threshold power level.

In some embodiments, the charger comprises at least one of a charging wire or a charging power source.

In some embodiments, a system is provided for activating a guidance light or performing any method described herein. The system comprises: a memory; a processor; a power source; a connector for receiving a charger for charging the power source; a guidance light being associated with the connector; and a module stored in the memory, executable by the processor, and configured to: determine occurrence of a trigger event for the guidance light; and in response to determining occurrence of the trigger event, activate the guidance light.

In some embodiments, the guidance light is built into the connector.

In some embodiments, the guidance light is located around a perimeter of the connector.

In some embodiments, the guidance light is located within a predetermined distance from the connector.

In some embodiments, a computer program product is provided for activating a guidance light for a mobile device or performing any method described herein. The computer program product comprising a non-transitory computer-readable medium comprising code configured to: determine occurrence of a trigger event for the guidance light; and in response to determining occurrence of the trigger event, activate the guidance light, the guidance light being associated with a connector located in the mobile device, the connector for receiving a charger, the charger for charging a power source in the mobile device.

BRIEF DESCRIPTION OF THE DRAWINGS

Figure 1:
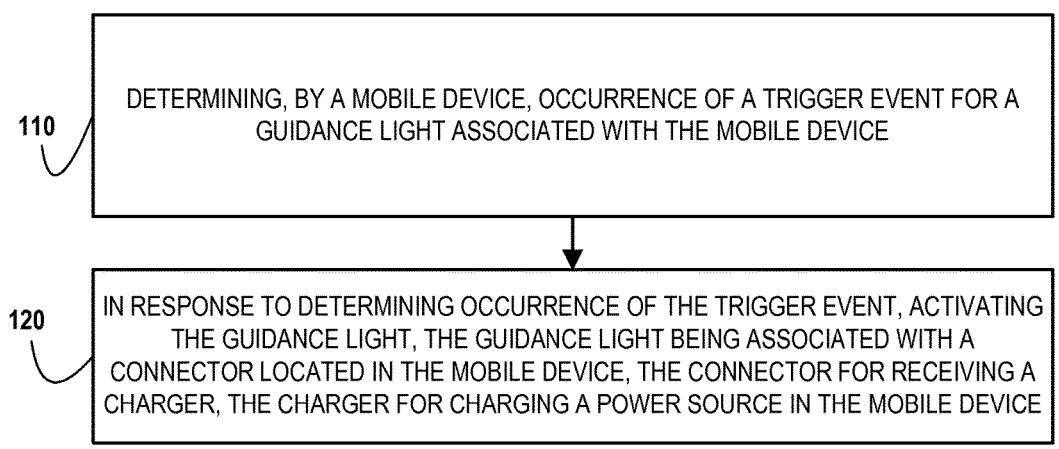
Figure 2:
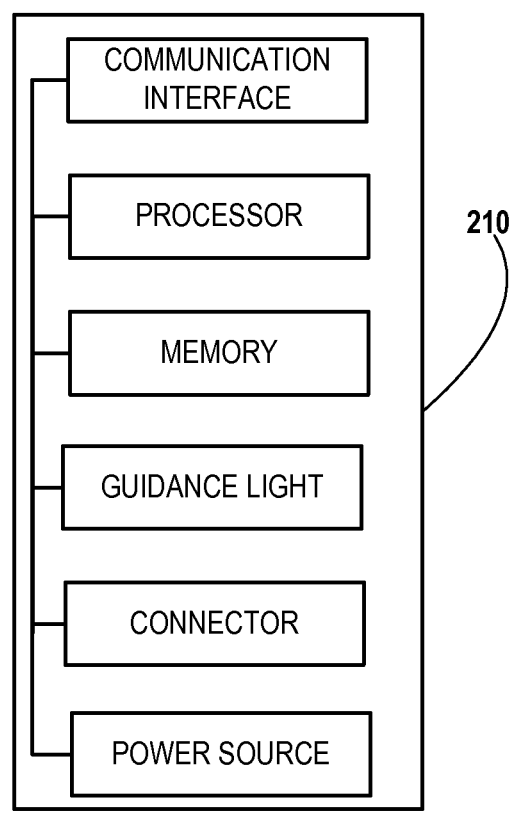
Figure 3:
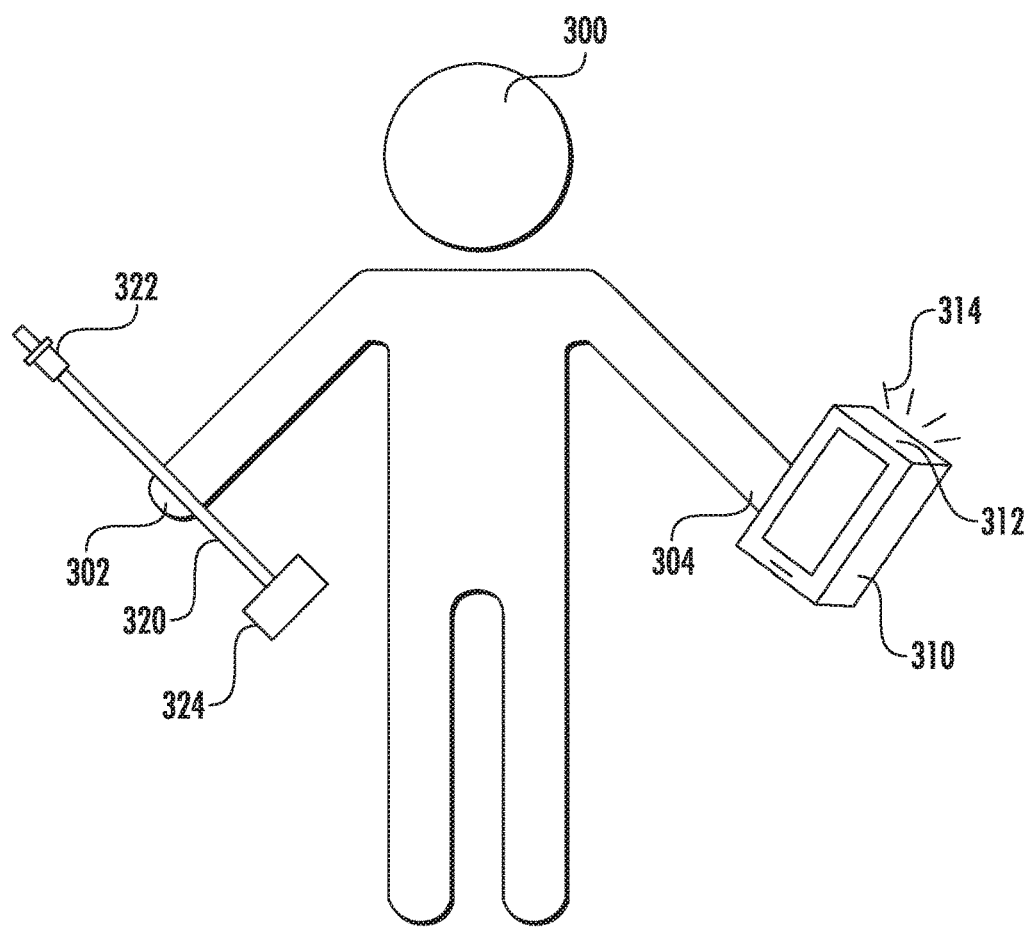
Figure 4:
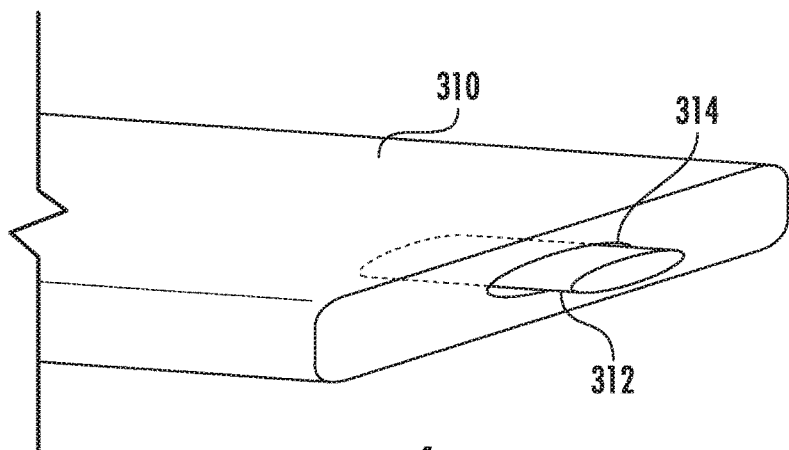
Figure 5:
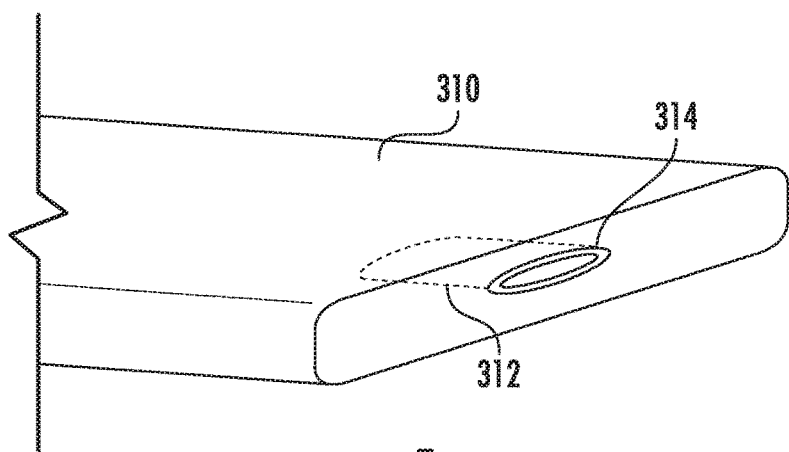
Figure 6:
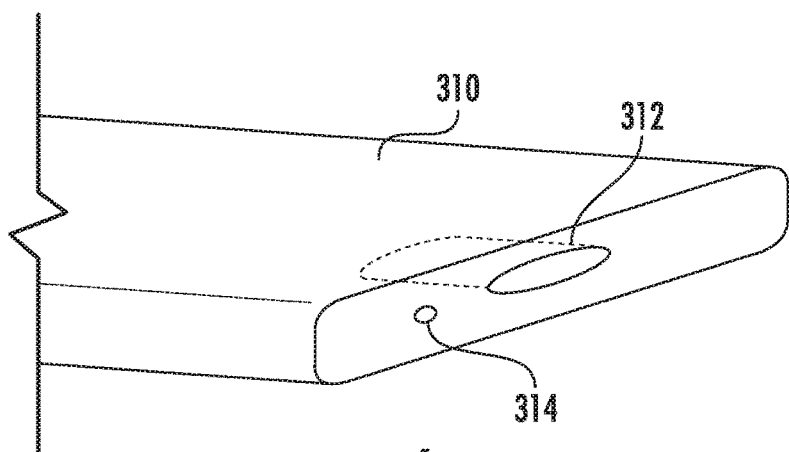

Having thus described embodiments of the invention in general terms, reference will now be made to the accompanying drawings, where:

FIG. 1 presents an exemplary process flow for activating a guidance light, in accordance with embodiments of the present invention;

FIG. 2 presents an exemplary mobile device comprising a guidance light, in accordance with embodiments of the present invention;

FIG. 3 presents a schematic diagram a user in which body area network ("BAN") techniques are used to detect the proximity of a mobile device to a charging wire, in accordance with embodiments of the present invention, FIG. 4 presents a partial view diagram of a mobile device in which a guidance light is built into a connector, in accordance with embodiments of the present invention, FIG. 5 presents a partial view diagram of a mobile device in which a guidance light is located around a perimeter of a connector, in accordance with embodiments of the present invention, and FIG. 6 presents a partial view diagram of a mobile device in which a guidance light is located within a predetermined distance from a connector, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to enabling a user of a mobile device to find a connector on the mobile device. The present invention provides a guidance light (e.g., a light emitting diode ("LED")) built into the connector or located near the connector (e.g., less than a threshold distance from the connector). In some embodiments, the guidance light may be provided around the perimeter of the connector, but is not built into the connector. The guidance light may be deactivated at most times, and may be activated in response to detecting a trigger event as described herein. In some embodiments, more than one guidance light may be provided on the mobile device.

When a charger is connected to the connector, the guidance light may also be used as an indicator light that shows the status of the charging process. For example, the guidance light may switch from a first color to a second color when the power level of the power source becomes equal to or greater than a threshold power level. Additionally or alternatively, the guidance light may switch from a first color to a second color when the power source reaches its maximum power level, i.e., when the power source is fully charged, or when the power source reaches its minimum power level. Additionally or alternatively, the intensity or brightness level of the guidance light may progressively increase as the power level of the power source keeps increasing during the charging process.

The trigger event for activating the guidance light can be one or more of several possible events. The trigger events are not limited to the trigger events described herein. For example, in some embodiments, the trigger event comprises an ambient light as detected by the mobile device being less than a threshold ambient light level. The ambient light is associated with the environment where the mobile device is located. In other embodiments, the trigger event comprises a power level of the mobile device power source being less than a threshold power level.

In some embodiments, the trigger event comprises determining whether a charger or charging wire is detected by the mobile device. The charger or charging wire (or cable) may be detected by the mobile device if the charger or charging wire is located at a distance less than a threshold distance from the mobile device (or from the connector of the mobile device). In other embodiments, the proximity of the charger or charging wire may be detected using a body area network ("BAN") technique. When the charging wire is grabbed by one hand of the user and the phone is in the other hand of the user, the mobile device can detect this event (e.g., detect that the charging wire is located near the mobile device), which then serves as a trigger event for activating the guidance light. In some embodiments, the trigger event occurs when the distance between the charging wire (or an end of the charging wire that comprises the charging head) and the mobile device (or specifically, the connector and/or the guidance light of the mobile device) is less than a threshold distance. When the distance is less than the threshold distance, the mobile device detects the presence of the charging wire (and/or charging head or charging power source) and activates the guidance light. In some embodiments, the various triggering events described herein may be used in combination.

Referring now to FIG. 1, FIG. 1 illustrates an exemplary process flow for activating a guidance light for a mobile device. The process flow may be performed by any device described herein. At step 110, the process flow comprises determining, by the mobile device, occurrence of a trigger event for the guidance light. In some embodiments, determining occurrence of the trigger event comprises determining whether a charger is detected by the mobile device. The charger may be detected using a BAN technique. In some embodiments, determining occurrence of the trigger event comprises determining whether a charger is located at a distance less than a threshold distance from the mobile device. Alternatively or additionally, determining occurrence of the trigger event comprises determining whether an ambient light level (e.g., associated with an environment in which the mobile device is located) is less than a threshold light level. Alternatively or additionally, determining occurrence of the trigger event comprises determining whether a power level of the power source is less than a threshold power level.

At step 120, the process flow comprises in response to determining occurrence of the trigger event, activating the guidance light. The guidance light is associated with a connector located in the mobile device. The connector receives a charger for charging a power source in the mobile device. The charger comprises at least one of a charging wire or a charging power source. The guidance light may be built into the connector. Alternatively or additionally, the guidance light is located around a perimeter of the connector. Alternatively or additionally, the guidance light is located within a predetermined distance from the connector.

In some embodiments, the process flow further comprises indicating, using the guidance light, a status of charging the power source. The guidance light may change color, intensity, or brightness when a power level of the power source is equal to or greater than a threshold power level.

The mobile devices described herein may comprise mobile computing devices, mobile televisions, mobile phones, laptop computers, smart screens, tablet computers or tablets, portable desktop computers, e-readers, scanners, portable media devices, gaming devices, cameras or other image-capturing devices, headgear, eyewear, global positioning system ("GPS") devices, watches, bands (e.g., wristbands) or other wearable devices, servers, routers, sensors, Internet of Things (IOTs), non-computing devices or systems, etc.

Referring now to FIG. 2, FIG. 2 presents an exemplary block diagram of a mobile device 210 comprising a guidance light. The mobile device is a computing device that comprises a communication interface, a processor, a memory, and a module stored in the memory, executable by the processor, and configured to perform the various processes described herein. Each communication interface described herein enables communication with other systems. Additionally, the mobile device comprises a guidance light and connector as described herein. The guidance light, connector, and power source (e.g., a battery) may be used in conjunction with the communication interface, the processor, and the memory to perform the various processes described herein.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

Referring to FIG. 3, a schematic diagram is shown of a user 300 in which body area network ("BAN") techniques are used to detect the proximity of a mobile device 310 to a charging wire 320, in accordance with embodiments of the present invention. The mobile device 300 includes a connector 312 that is configured to receive the charging head 322 of the charging wire 320. The charging wire 320 is operably connectable to a charging power source 324, such that, in response to connecting the charging wire 320 to the charging power source 324 and inserting the charging head 322 into the connector 312 of the mobile device 310, a power supply in the mobile device 310 is charged. In specific embodiments of the invention, the triggering event for activating the guidance light 314, which is located proximate to the connector 312 in the mobile device 310, is having the mobile device 310 determine that the user 300 grabbed, or otherwise is holding, the charging wire 320 in one hand (i.e., second hand 302), while the user 300 is holding the mobile device 310 in the other hand (i.e., first hand 304). Thus, in response to such a determination, the guidance light 314 is activated.

Referring to FIGS. 4-6, a partial view diagram of a mobile device 310 is depicted, in accordance with embodiments of the present invention. In the illustrated embodiment, the mobile device 310 has a connector 312 located in the mobile device 310 that is configured to receive a charging head 322 (shown in FIG. 3) of a charging wire 320 (shown in FIG. 3). In FIG. 4, the guidance light 314 is built into the connector 312. In FIG. 5, the guidance light 314 is located around a perimeter of the connector 312. In FIG. 6, the guidance light 314 is located within a predetermined distance from the connector 312.

In accordance with embodiments of the invention, the term "module" with respect to a system (or a device or apparatus) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for activating a guidance light for a mobile device, the method comprising:
   determining, by the mobile device using a Body Area Network (BAN) technique, that a distance between the mobile device and a charging wire is less than a predetermined threshold distance, wherein the charging wire is configured to be operably connectable to a charging power source; and
   in response to determining that the distance between the mobile device and the charging wire is less than the predetermined threshold distance, activating the guidance light, the guidance light being built into a connector located in the mobile device, the connector for receiving a charging head of the charging wire, the charging power source for charging a power source in the mobile device.

2. The method of claim 1, further comprising indicating, using the guidance light, a status of charging the power source.

3. The method of claim 1, wherein the guidance light changes color, intensity, or brightness when a power level of the power source is equal to or greater than a threshold power level.

4. An apparatus for activating a guidance light, the system comprising:
   a mobile device including:
      a memory;
      a processor in communication with the memory;
      a power source;
      a connector configured for receiving a charging head of a charger wire;
      a guidance light being located in the connector; and
      a module stored in the memory, executable by the processor, and configured to:
         determine, using a Body Area Network (BAN) technique, that a distance between the mobile device and the charging wire is less than a predetermined threshold distance; and
         in response to determining that the distance between the mobile device is being held in a first hand of a user and the charging wire is less than the predetermined threshold distance, activate the guidance light.

5. The apparatus of claim 4, wherein the guidance light changes color, intensity, or brightness when a power level of the power source is equal to or greater than a threshold power level.

6. The apparatus of claim 4, wherein the guidance light indicates a status of charging the power source.

7. A computer program product for activating a guidance light for a mobile device, the computer program product comprising a non-transitory computer-readable medium comprising code configured to:
   determine, using a Body Area Network (BAN) technique, that a distance between the mobile device and a charging wire is less than a predetermined threshold distance; and
   in response to determining that the distance between the mobile device is being held in a first hand of a user and the charging wire is less than the predetermined threshold distance, activate a guidance light, the guidance light being located in a connector located in the mobile device, the connector for receiving a charging head of a charging wire, the charging wire operably connectable to a charging power source for charging a power source in the mobile device.

* * * * *